3,256,245
PRODUCTION OF HIGH MOLECULAR WEIGHT POLYOXYMETHYLENES
Kuno Wagner, Leverkusen, Germany, assignor to Farbenfabriken Bayer Aktiengesellschaft, Leverkusen, Germany, a German corporation
No Drawing. Filed Mar. 26, 1962, Ser. No. 182,641
Claims priority, application Germany, May 12, 1961, F 33,902
6 Claims. (Cl. 260—67)

The present invention relates to the production of high molecular weight polyoxymethylenes by polymerizing monomeric formaldehyde, and more especially to the polymerization of relatively impure monomer formaldehyde by means of specific catalysts.

It is known that practically anhydrous, highly purified formaldehyde with a water content of less than 0.1% can be polymerized in an inert solvent with the aid of various catalysts, such as tertiary and quaternary nitrogen bases, metal salts, metal alcoholates, organo-metallic compounds, sulphonium salts or phosphonium salts, to give polyoxymethylenes of high molecular weight. In order to obtain high molecular weight polyoxymethylenes with high-grade physical properties, such as high bending strength and good impact toughness, when using the prior known processes, it is necessary for the sum of all impurities in the formaldehyde (for example water, formic acid, methanol, methylal and methylformate), to be lowered to such a degree by complicated purification processes that they do not amount to more than 0.1 percent by weight, and the water content should not exceed 0.01 to 0.05%. This condition must be satisfied, since relatively large quantities of impurities lead to premature breaking of the polyoxymethylene chains, so that polyoxymethylenes are obtained which have an average molecular weight which is too low to be of industrial interest on account of their poor physical properties.

The high degree of purity of the formaldehyde gas necessary for carrying out the above processes is known to necessitate several costly processing steps for purifying the gas, and low temperatures are used in order to freeze out the impurities or to remove them by prepolymerization of formaldehyde. In this connection, owing to the formation of prepolymers of relatively high molecular weight (in which therefore only a small quantity of water is bonded by a relatively large quantity of formaldehyde), the yield of formaldehyde which can be used for polymerization purposes is greatly reduced.

The United States applications Serial No. 134,868, filed August 30, 1961, and now abandoned, and Serial No. 139,053, filed September 19, 1961, are concerned with processes by which relatively impure formaldehyde with a water content of about 0.5 to 0.9% is introduced into a neutral organic solvent or into a solvent having an acylating or alkylating action, and special catalysts (advantageously compounds of divalent tin) are added to the polymerization medium.

With such a process, it is therefore possible for the chain-breaking reactions caused by water and other impurities to be substantially retarded in their progress so that polyoxymethylenes of high molecular weight with intrinsic viscosities (measured in dimethylformamide or butyrolactone at 150° C. in 0.5% solution) of about 0.6 to 3 are obtained, these corresponding to average molecular weights of about 30,000 to 150,000.

It has now been found that the production of polyoxymethylenes of high molecular weight (i.e. polyoxymethylenes having a molecular weight of more than 10,000) from formaldehyde can be substantially simplified by polymerizing formaldehyde having a water content of about 1 to 5% and/or a methanol content of about 0.1 to 2% in inert solvents, in acylation or alkylation agents or their mixtures, in the presence of catalytically acting compounds of divalent tin. According to this process it is possible for relatively impure formaldehyde (such as that obtainable for example by pyrolysis of paraformaldehyde), to be used for the polymerization without performing any intermediate purification by freezing out, prepolymerization or other steps, and to convert this impure formaldehyde into high molecular weight polyoxymethylenes having valuable industrial properties.

This discovery is surprising, in that with prior known polymerization catalysts, i.e. anionic polymerization catalysts, such as tertiary or quaternary nitrogen bases, and cationic polymerization catalysts, such as $BF_3$ and $AlCl_3$, very low molecular weight polyoxymethylenes similar to paraformaldehyde are obtained when relatively impure formaldehyde vapours prepared by decomposition of paraformaldehyde are introduced in quantitative amounts into the various types of polymerization media. This is because in these cases the chain-breaking reactions caused by water and other impurities proceed very rapidly and do not permit the formation of polyoxymethylenes of high molecular weight. Moreover, with compounds of other divalent or polyvalent metals (such as salts of copper, cadmium, zinc, iron, cobalt, nickel or tetravalent tin, with compounds of titanium or with Grignard compounds), it is not possible to transform a formaldehyde with the aforementioned high degree of impurity into polyoxymethylenes of high molecular weight in satisfactory yields. Chain-breaking reactions or transfer reactions with the entrained impurities or the polymerization media which are used also take place several times more quickly in the absence of these compounds than is the case when polymerization with the compounds of divalent tin which are to be used according to the invention.

For carrying through the process according to the invention, it is advantageous to work with formaldehyde vapours which contain about 2 to 3% by weight of water and up to about 1% by weight of methanol. A formaldehyde of this degree of impurity can be prepared in a simple manner by pyrolyzing paraformaldehyde in the absence or presence of heat-transfer agents. The pyrolysis gases which are obtained are then transferred, at temperatures of about 70–150° C. (while avoiding any initial polymerization), into the polymerization vessel, if required under pressure. A good source for the production of formaldehyde vapours which contain methanol and have a relatively low water content are formaldehyde gases which are obtained by the pure dehydrogenation of methanol in the absence of hydrogen acceptors. Frequently it is desirable to free such gases from traces of colored, readily volatile unknown substances, by washing them in solvents, such as paraffin oil, which are heated to a temperature above 70° C., any prepolymerization of formaldehyde being avoided if a sufficiently high temperature is chosen.

Examples of catalysts which may be used in the process of the invention are salts of divalent tin with formic, acetic, propionic, crotonic, butyric, 2-ethyl-caproic, palmitic, stearic, oleic, alkylated benzoic, alkylated salicylic, phenylacetic, cyclohexane-carboxylic acids or other aliphatic, cycloaliphatic, aromatic or araliphatic carboxylic acids, which can be substituted, for example by halogen atoms, nitro, hydroxy, etherified hydroxy or alkyl groups. Also to be mentioned are stannous salts of polycarboxylic acids, such as those of hexahydrophthalic acid and tetrapropenyl succinic acid. It is also possible to use organometallic compounds of divalent tin, such as diphenyl-tin and freshly prepared and very finely divided or colloidal solutions of stannous hydroxides, which can be obtained in a particularly finely divided form, for example by hydrolysis of stannous salts of organic acids in water-containing dioxane. It is even possible to use stannous salts of relatively strong organic acids, such as the stannous salt of di-n-butyl-naphthalene-1-sulphonic acid. On the other hand halides and hydroxy-halides of divalent tin are less suitable.

On account of their ready accessibility, the preferred catalysts are neutral or basic stannous salts or aliphatic carboxylic acids with more than 2 and up to 20 carbon atoms.

If basic salts are used, the basicity of these salts can be defined as follows:

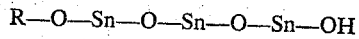
$$\text{Basicity } (B) = \left(\frac{M}{E} - 1\right) \cdot 100\%$$

in which the number of equivalents of the metal is represented by M and the number of equivalents of the organic acid contained in 100 g. of the sample is represented by E. The basicity of the salts which can be used can fluctuate within wide limits and salts with basicities of 5 to 20% are preferably used. These salts thus contain the metals in an excess of 5 to 20% calculated on that quantity which is theoretically necessary for displacing the acid hydrogen atoms of the organic acid. In particular, basic salts of waxy to oily consistency have the property of only being completely soluble in relatively concentrated solutions, whereas in dilute solutions, they tend to precipitate opalizing and finely suspended particles. These basic fractions, which can for example often be precipitated easily with petroleum ether, cannot be accurately defined chemically, but correspond substantially to products of the composition R—O—Sn—O—Sn—O—Sn—OH in which R represents an acyl radical. Such polymeric tin compounds are for example not split by weak organic acids, such as butyric, caproic, oleic and like acids, so that it is also possible to use the basic salts in the presence of excess quantities of acid for the polymerization of formaldehyde.

The salts of divalent tin which are preferably used can be prepared easily by known processes by reacting stannous hydroxide with carboxylic acids in an organic solvent or by reacting stannous halides with the organic acids in the presence of concentrated NaOH or KOH, the water which forms advantageously being distilled off azeotropically with the aid of an organic solvent, such as benzene or toluene. The production of basic salts with any desired B-values (smaller or larger than 100%) is for example easily carried out in accordance with the data given in British patent specification 786,167.

The stannous compounds used for the polymerization present considerable differences, depending on the constitution, when initiating the formaldehyde polymerization. Thus, stannous salts of 2-methoxybenzoic acid or stannous salts of hydroxyethylated salicylic acids are appreciably more active than stannous salts of aliphatic carboxylic acids, whereas these latter are again much more active than stannous salts of organic carboxylic acids substituted by secondary or tertiary amino groups. The varying activity of the aforementioned tin salts can be made use of in producing different types of polyoxymethylene having various intrinsic viscosities.

In order to carry out the polymerization process according to the invention, it is advantageous that the formaldehyde is gradually introduced into the polymerization medium and is constantly activated with freshly supplied catalyst. This results in increased yields of polyoxymethylenes of high molecular weight. It is usual to work with 0.000015 to 0.01 mol, advantageously with 0.0001 to 0.002 mol of catalyst per mol of formaldehyde, when polymerizing in solvents having a neutral or alkylating action. On the other hand, if polymerization is carried out in acetic anhydride or other acylation agents, it is advantageous to use substantially higher concentrations, namely 0.001 to 0.006 mol of catalyst per mol of formaldehyde.

The catalysts are advantageously used in the form of 0.01 to 1% solutions in inert solvents, in solvents having an acylating or alkylating action. (Suitable inert solvents are aliphatic hydrocarbons, preferably halogenated aliphatic hydrocarbons, such as hexane, octane, cyclohexane, methylene chloride, chloroform, 1,2-dichloropropane, carbon tetrachloride, aromatic hydrocarbons, halogenated aromatic hydrocarbons, such as benzene, toluene, diisopropylbenzene, chlorobenzene, esters, preferably esters of carboxylic acids, such as acetic acid with saturated monohydric alcohols, such as ethanol, propanol, butanol, ethers, such as diethylether, dioxane, tetrahydrofurane. The preferred solvent having an acylating action is acetic anhydride, however, also other anhydrides of carboxylic acids may be used. Suitable solvents having an alkylating action are for instance the ethyl ester of orthoformic acid, formaldehyde dimethylacetal.) The catalyst is as far as possible proportioned uniformly throughout the entire period of the polymerization. It is obvious that the speed of supply of the catalyst is variable and is dependent on the flow velocity at which the formaldehyde is supplied to the polymerization vessel. For example, when operating intermittently, it is advantageous to supply initially 30 to 70% of the catalyst solution which is required and for the residual quantities to be proportioned throughout the entire period of the polymerization by means of a proportioning pump. An accurate and continuous proportioning of the catalyst is important, because the formaldehyde, for example with a degree of impurity of 2.5% of water and 0.1 to 0.3% of formic acid, entrains impurities which are themselves of catalytic activity. However, on account of the much higher activity of the divalent stannous compounds, this catalytic activity is of no importance in practice, provided these compounds are present in a sufficient concentration in the polymerization mixture.

If polymerization is carried out in an acylating solvent or in a mixture of a neutral solvent with an acylating solvent, such as acetic anhydride (ratio in parts by weight 1:1 to 1:9), care should be taken that numerous salts of divalent tin with relatively long organic radicals exchange these radicals for the acetyl radical, particularly quickly upon heating, whereby practically insoluble stannous acetate is formed in the cold. Consequently, it is advisable to use stannous salt concentration of only about 0.1 to 0.3% when polymerizing in acetic anhydride, since these concentrations do not lead to a rapid precipitation of difficulty soluble stannous acetate.

However, it is substantially more advantageous for such catalyst preparations to have added thereto complex-forming agents, such as 1-phenyl-2,3-dimethyl-5-pyrazolone, hexamethylene tetramine or the reaction products thereof with acetic anhydride (dimethylol-acetamide diacetate), or other carboxylic acid anhydrides, since, these compounds, with stannous salts, readily form addition complexes which are several times more soluble than stannous acetate. It is expedient to use the complex formers in quantities of about 1–5 mols per mol of catalyst. With whatever long a heating of the catalysts in acetic anhydride, the sparingly soluble stannous acetate is no longer precipitated on cooling, if the usual concentrations are maintained.

These complex-forming agents are furthermore able to have a chain-regulating action during the polymerization, so that if necessary the possibility is provided of reducing the average molecular weights of the polyoxymethylenes and of thus obtaining products having improved workability. The said complex formers also make it possible for the catalyst to be substantially removed from the polymers, whereby the thermostability is increased. For this purpose, they can also be used in the stabilization of the terminal groups by acetylation in quantities of about 1 to 5%, advantageously 3 to 4%, calculated on the polyoxymethylene (see Example 6). It is surprising that these complex formers also have the property of substantially retarding the recurrent decomposition of the non-acylated polymers at elevated temperature. A corresponding behaviour is also shown by the film-forming polyamides and polyurethanes of high molecular weight, for example polycaprolactam, polyhexamethylene adipamide, polyhexamethylene sebacamide, or the polyurethane obtained from 1 mol each of an organic diisocyanate, such as hexamethylene diisocyanate and a dihydric alcohol, such as glycol, 1,4-butylene glycol, 1,6-hexandiol. Since the heterogeneous non-catalyzed acetylation of polyoxymethylenes is a reaction which takes place very slowly, the depolymerization by the occluded catalyst can only be prevented if the latter is de-activated. Since the acetylation catalyst diffuses very slowly towards the polyoxymethylene terminal group and, as already stated, the non-catalyzed reaction of the semi-acetal group is a very slow reaction, very appreciable losses in yield can occur in the absence of the said complex formers. One preferred embodiment of the process according to the invention is consequently the conduction of the polymerization in dilute polyurethane or polyamide suspensions (about 0.01 to about 0.2% dispersion) or in the presence of the aforesaid complex formers, thus providing a working method which ensures, after the stabilization of the terminal groups, that a minimum content of ash is obtained with the polymers, whereby an optimum value as regards the thermostability and the color properties of the polyoxymethylenes of high molecular weight may be obtained. This optimum value is more especially produced when polyoxymethylenes with intrinsic viscosities of from 0.6 to 1 are produced by the process of the invention.

Another important function which is attributed to the said complex formers is their stabilizing action on heating with very pure acetic anhydride in the presence of acetylation catalysts, for example anhydrous sodium acetate. Whereas for example 1000 parts by volume of an acetic anhydride with a free acetic acid content of 0.2% change into a blackish-brown solution in the presence of 1 part by weight of sodium acetate on being heated for 20 hours under reflux, so that considerable quantities of free acid (about 4 to 5%) are formed despite careful exclusion of moisture, a golden yellow solution is obtained when using the same procedure, but with an addition of 4 parts by weight of 1-phenyl-2,3-dimethyl-5-pyrazolone or hexamethylene tetramine. It is obvious that the same secondary reaction occurs with each polyoxymethylene acetylation under the same conditions. The increase in the acid level can in this case either be a condensation of the carbonyl groups with $CH_3$ groups catalysed by sodium acetate, with formation of water, or be attributed to a decomposition into ketene and free acetic acid. The resinous, brownish-black substances formed can have a very serious effect on the color of the polyoxymethylenes obtained with long acetylation times, such as the times which must be maintained, especially with products of very high molecular weight. On the other hand, when using the said complex formers, products which are completely satisfactory as regards color are obtained.

The above recited aromatic, araliphatic, cycloaliphatic and/or aliphatic hydrocarbons, as well as their halogenation products or esters or ethers, can be used as inert solvents for the polymerization. However, it is advantageous to work in methylene chloride, since the latter is an excellent solvent for formaldehyde hydrates of low molecular weight which form, and because this solvent can be prepared with a particularly high degree of purity. Solvents such as 1,3-dichloropropane can also be used. Carbon tetrachloride and chloroform can also be employed for the polymerization provided they are sufficiently free from hydrogen chloride and phosgene. The water content of these solvents should be kept within a range of about 0.01 to 0.1 percent by weight of solvent.

If the polymerization is carried out in acylation agents, then acetic anhydride, perhaps admixed with other solvents, is preferred. Furthermore, other acylation agents as described in United States patent application Serial No. 139,053, filed September 19, 1961, can be used, and, after the polymerization, the acylation can in principle be effected by the processes disclosed therein.

If the polymerization is carried out in alkylation agents, then ethyl orthoformate is preferred as solvent and in addition the alkylation agents and processing steps disclosed in United States patent application Serial No. 139,053, filed September 19, 1961, can be utilized.

The quantity of solvent used can vary within wide limits. It is usually advisable to employ about 7 to 12 parts by volume of solvent to 1 part by weight of formaldehyde. Generally, the catalyst is dissolved in the same solvent in which the polymerization is carried out.

The polymerization can take place in a temperature range from −120° to +70° C., advantageously between −20 and +40° C. The flow velocity at which the formaldehyde vapors are added or introduced into the polymerization vessel can vary and depends on the speed of pyrolysis and also on the temperature level in the polymerization vessel.

In order to reduce the molecular weights of the polymers obtained, compounds of monovalent or polyvalent metals other than stannous compounds can be used in combination with the present catalysts in quantities of 10 to 60 percent by weight, calculated on the stannous compounds used. Examples of such other metal compounds are salts of divalent cobalt, calcium, magnesium, copper, nickel, iron and of sodium (especially with organic acids, such as aliphatic, cycloaliphatic, araliphatic, aromatic carboxylic acids, such as acetic propionic, 2-ethyl caproic cyclohexane carboxylic, phenyl acetic, benzoic acids), organo-metallic compounds, such as butyl-lithium, triethyl aluminium, triphenyl aluminium, phosphines, Grignard compounds, such as phenyl magnesium bromide or complex salts of the above polyvalent metals, such as acetylacetonates or dithiocarbamic acid salts. However, it is decidedly more advantageous to use methylene glycol diacetate, hexamethylene tetramine, higher liquid homologues of methylene glycol diacetate and formaldehyde hydrates of low molecular weight, the latter corresponding to the formula HO—$(CH_2—O)_xH$, wherein $x$ is an integer of 1 to 5.

Methylene glycol diacetate can also often be used in combination with acetic anhydride, or acetic anhydride can be used alone, as highly effective chain-breaking agent. Methylene glycol diacetate and its higher homologues (corresponding to the formula

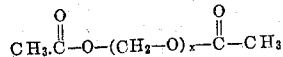

wherein $x$ is an integer of 1 to 5) are of particular importance as chain-breaking agents, since in the presence thereof, there is found a distinct increase in the polymerization speed when polymerizing with stannous compounds. These chain-breaking agents are preferably applied in amounts of 0.5 to 10 parts by weight per one part by weight of stannous compound.

Furthermore, tertiary bases, such as pyridine, tri-n-butylamine, N-methyl morpholine or dimethyl aniline, can be added in order to reduce the average molecular weights of the polymers which are obtained. In this case, however, care is to be taken that the molar quantity of base does not exceed the molar quantity of stannous compounds, since otherwise there are often interruptions in the course of the polymerization, for example due to a complete de-activation of the stannous compound. In order to avoid such disturbing effects, care should be taken that the solvents used in the polymerization are as free as possible from uncontrollable quantities of basic substances and also free from traces of strong acids, such as $H_2SO_4$, oxides of sulphur, HCl and the like. In addition, if carrier gases are used, these should be free from basic impurities and as far as possible free from oxygen.

Where polymerization has taken place in inert solvents, the polymer is separated from the solvent by filtration or centrifuging. The process can be carried out continuously or semi-continuously; fresh solvent and fresh catalyst can be supplied to the polymerization vessel at the rate at which the separation of the polymer takes place. The polyoxymethylenes of high molecular weight which are thus obtained can be stabilized in a manner known per se by acylation or etherification, as indicated by way of example in British patent specifications 864,403, 868,356, 869,323.

Where polymerization has taken place in solvents having an acylating action, acylation catalysts and advantageously complex formers, such as hexamethylene tetramine, are added to the mixture after completion of polymerization, which mixture is then heated to temperatures above 100° C. and up to about 180° C. in order to react all terminal groups and remove catalyst residues.

The great advantage of the process according to the invention over the prior known polymerization processes, is that relatively highly impure formaldehyde can be polymerized to give polyoxymethylenes of high molecular weight and at the same time a purification of the formaldehyde vapors by prepolymerization and also the difficult continuous removal of the prepolymers are entirely dispensed with. One essential advantage is the ready availability of the impure formaldehyde used for the polymerization. Other advantages of the process according to the invention are that the catalyst residues can be removed substantially more easily from the polyoxymethylenes of high molecular weight, whereby their thermostability and their color properties after processing are substantially improved and in addition there is provided an improved possibility of chain regulation and of producing polyoxymethylenes of high molecular weight which can be processed more easily.

The polyoxymethylenes produced by the process of the invention and stabilized by the methods indicated above, can be processed with and without additions of other substances into high-grade plastics; such substances are for example stabilizers, antioxidants, plasticizers, fillers, pigment colors and the like.

In the following examples, the solvents are indicated in parts by volume, whereas the other parts are parts by weight, the parts by volume being mililliters in case that the parts by weight are grams.

Example 1

140 parts of paraformaldehyde with a water content of 3% are decomposed at 180–200° C. in substance in a round-bottom flask. The hot formaldehyde vapors pass through a double jacketed stainless steel tube heated by steam to about 100° C. by way of a cover which is also heated with steam and which is provided with a thermometer connection, a stirrer device and a discharge pipe, the said vapours then entering a cylindrical reaction vessel. The latter has a cross-section of about 12 cm. and a capacity of about 2000 ml., and is connected through an insulating packing with the hot cover. The outlet point of the heated stainless steel supply pipe is about 2 cm. above the liquid level of the polymerization medium. The discharge pipe of the heated cover is connected to a Woolf flask, which contains water as barrier and receiving liquid and is safeguarded against excess pressure by means of a small rising pipe. The polymerization medium consists of 1400 parts of pure methylene chloride, which has a water content of 0.02%, and 0.3 part of a stannous salt of 2-ethyl caproic acid and 0.3 part of 1-phenyl-2,3-dimethyl-5-pyrazolone dissolved therein. The hot impure formaldehyde vapours, are supplied with complete suppression of the initial polymerization, (i.e. while maintaining their degree of impurity) to the liquid surface which is stirred at about 60 r.p.m. The polymerization starts immediately and the pyrolysis is complete in about 2 hours. Although the formaldehyde vapors are only supplied to the surface of the inert solvent, the absorption of formaldehyde is excellent, and in spite of the gas discharge pipe being open towards the Woolf flask, less than 2% for formaldehyde are found in the barrier liquid after completion of polymerization. The polymerization temperature in the reaction vessel is kept at about 10 to 20° C. by cooling with water. After completion of the polymerization, the polymerization product is filtered on a suction filter, washed with acetone and dried in vacuo at 30° C. There is obtained a pure white polyoxymethylene of high molecular weight with a yield of 110 parts. About 9% of oligomers and paraformaldehyde-like products of low molecular weight are included in the product, but these are destroyed by acetylation for 5 to 15 hours in acetic anhydride in the presence of sodium acetate as catalyst and in the presence of 4 parts of hexamethylene tetramine or 1-phenyl-2,3-dimethyl-5-pyrazolone and transformed into methylene glycol diacetate. The pure white, acetylated polyoxymethylene which is obtained has an intrinsic viscosity of 1.41 (measured in 0.5% solution at 150° in dimethyl formamide) and an ash content lower than 0.005% of $SnO_2$.

The readily soluble oligomers of low molecular weight which are in the methylene chloride mother liquor are freed from methylene chloride by gentle evaporation in vacuo at temperatures below 0° C. and with careful exclusion of moisture.

The products which are obtained, in the unaged condition, have a water content of 9% and consequently contain on average 1 molecule of water combined with approximately 7 molecules of formaldehyde.

Example 2

The procedure is as described in Example 1, but the temperature of the formaldehyde vapors supplied is raised to about 135° C., and the quantity of paraformaldehyde decomposed per unit of time is increased such that about 5,000 parts of paraformaldehyde are taken up over a period of 30 minutes by 180,000 parts of methylene chloride, while the stirring speed is also increased from 60 to about 200 r.p.m. Thus, the polymerization is effected with substantially more uniform distributiton of the formaldehyde and its impurities and with a smaller concentration of these impurities in the solvent. Very uniform, fiber-like polyoxymethylenes of high molecular weight are obtained. They are almost completely free from paraformaldehyde-like oligomers of low molecular weight and, after being acetylated in accordance with Example 1, lose less than 3% in weight, even after an acetylation period of 15 hours. $\eta = 1.6$. If the oligomers present in the methylene chloride mother liquor are isolated in accordance with Example 1, these have a water content of about 35%. Therefore, whereas one molecule of water is on average combined with 7 molecules of formaldehyde in the oligomers in Example 1, under less favorable conditions as regards equipment and concentration ratios, there is in this case on molecule of water combined with about 1.7 molecules of formaldehyde. In the unaged condition, the oligomers obtained are viscous oils and consist practically of formaldehyde hydrate, $HOCH_2OH$, and $HOCH_2OCH_2OH$ and, with the ageing, change by condensation into butter-like products and finally into solid paraformaldehyde-like products, with water being split off. Consequently, this example illustrates that polymerization and formation of formaldehyde hydrates, when using stannous compounds as polymerization catalysts, can take place side-by-side practically without any disturbance and that the further condensation of the hydrates of low molecular weight with fresh formation of water can scarcely occur under favorable processing conditions.

Example 3

The procedure of Example 1 is followed, but there is used for generating the formaldehyde vapors a paraformaldehyde which contains 2.5% of water in combined form and has a methoxyl group content of 0.8%. Freshly distilled methylene chloride is used as solvent and the catalyst concentration according to Example 1 is employed, but no 1-phenyl-2,3-dimethyl pyrazolone is added to the polymerization medium. After working up and drying in accordance with Example 1, there are obtained 115 parts of polyoxymethylene of high molecular weight, and after this has been acetylated, it shows an intrinsic viscosity (measured in butyrolactone in 0.5% solution) of 1.78. If the product is only acetylated with sodium acetate or with pyridine as acetylation catalyst in acetic anhydride, and purified with acetone, water and acetone, and thereafter dried, then in contrast to the acetylated product of Example 1, a polyoxymethylene of high molecular weight is obtained which has an ash content of 0.08%, and with a substantially less satisfactory thermostability than the product according to Example 1.

*Example 4*

The procedure is as indicated in Example 1 (methylene chloride as polymerization medium) and the following stannous compounds are used as catalysts:

(a) 0.7 part of tin oleate
(b) 0.8 part of tin hexahydrophthalate
(c) 0.5 part of the stannous salt of 2-hydroxy-5-tert.-butyl benzoic acid
(d) 3 parts of the stannous salt of tetrapropenyl succinic acid
(e) 0.5 part of diphenyl-tin
(f) 0.7 part of finely divided stannous hydroxide, prepared from stannous octoate in 100 parts by volume of dioxane and 1 part by volume of water
(g) 1 part of the stannous salt of di-n-butyl-naphthalene-1-sulphonic acid.

After polymerization, acetylation and working up in accordance with Example 1, there are obtained the polyoxymethylenes of high molecular weight as indicated in the table, these having intrinsic viscosities which are determined at 150° C. in butyrolactone in 0.5% solution.

| Catalyst | Intrinsic viscosity | Yield, parts |
|---|---|---|
| (a) | 1.84 | 105 |
| (b) | 1.42 | 95 |
| (c) | 1.35 | 82 |
| (d) | 1.49 | 91 |
| (e) | 1.26 | 75 |
| (f) | 1.25 | 79 |
| (g) | 1.35 | 71 |

*Example 5*

The procedure indicated in Example 1 is followed, but using the alkylation agents indicated in the table as polymerization medium. At commencement of polymerization, 0.4 part of a stannous salt of 2-ethyl caproic acid dissolved in 10 parts of toluene are added to 1400 parts of solvent. During the polymerization, another 0.3 part of the catalyst is added dropwise in dilute solution, being distributed substantially uniformly throughout the polymerization period. The products indicated in the table are filtered off after polymerization, washed with acetone and dried at 40° C. in vacuo. They contain approximately 10 to 15% of paraformaldehyde-like products which can easily be removed and consist for 90 to 95% of polyoxymethylenes which are of very high molecular weight but which are only alkylated to a subordinate degree. In order to be able to establish the intrinsic viscosity without appreciable degradation, these products are acetylated, since an appreciable degradation occurs with the alkylation, which per se can be carried out, by heating the formed polymer in alkylation agents in the presence of small quantities of boron trifluoride etherate. The intrinsic viscosity values of the table consequently relate to the acetyl derivatives of the polymers.

| Solvent | Intrinsic viscosity | Yield, parts |
|---|---|---|
| Methylal (99%) | 1.25 | 65 |
| Ethylorthoformate | 1.48 | 105 |
| Methylal+ethylene glycol-formaldehyde acetal (2:1) | 1.35 | 88 |

*Example 6*

The procedure of Example 1 is followed. To produce the formaldehyde vapours, a paraformaldehyde is used which contains 2.5% of water in combined form and has a methoxyl group content of 0.8%. The polymerization medium consists of 1400 parts of the solvents indicated in the table, which respectively contain, in fine suspension, 0.5 part of a polyurethane of high molecular weight obtained from hexamethylene diisocyanate and 1,4-butylene glycol, or 0.5 part of a polyamide of high molecular weight obtained by polymerizing caprolactam. The polymers obtained are worked up according to Example 1, they are possibly ground with 4 parts of hexamethylene tetramine to 100 parts of polyoxymethylene or with the same quantity by weight of 1-phenyl-2,3-dimethyl-5-pyrazolone, the products are acetylated in known manner in the presence of catalytic quantities of sodium acetate and polyoxymethylenes of high molecular weight are obtained which have an excellent quality as regards colour and an improved yield, with long acetylation times of 15 hours and also with a very slight or no ash content. The intrinsic viscosity values of the products are obtained at 150° C. in butyrolactone in 0.5% solution.

| Solvents | Intrinsic viscosity | Yield, parts | Ash, percent |
|---|---|---|---|
| Methylene chloride | 1.57 | 91 | 0.22 |
| Methylene chloride+polyamide+ 0.015% of hexamethylene tetramine | 0.95 | 105 | none |
| Methylene chloride+polyurethane | 1.39 | 108 | 0.03 |
| Ethyl acetate | 1.78 | 89 | 0.05 |
| Toluene+polyamide | 1.59 | 85 | 0.04 |
| 1,2-dichloropropane+polyamide | 1.28 | 80 | 0.06 |

The acetylation reaction 1 carried out without use of hexamethylene tetramine and without the said additives has a brownish-black color after being acetylated for 15 hours with catalytic quantities of sodium acetate. The products obtained from this mixture and then purified are certainly relative light in colour when in powder form, but they have a yellowish toning in the molten state. On the other hand, the mother liquors of the acetylation products prepared with the additives are light yellow in colour, but the isolated products in powder form are radiantly white and fused elements manufactured therefrom are of an excellent quality as regards colour which is also maintained after relatively long thermal stressing, especially as regards the ash-free products. The ash-free products in particular have an excellent thermal stability such as for example a decomposition of less than 0.1% of $CH_2O$ per minute at 222° C., whereas the product 1 with its ash content of 0.22% has a substantially less satisfactory thermal stability, for example shows a decomposition of 0.85% of $CH_2O$ per minute at 222° C.

*Example 7*

The procedure of Example 1 is followed, but using, as polymerization medium, acetic anhydride which is free from halogen, alkali and oxides of sulphur and which has a free acetic acid content of 0.35%. Substantially increased quantities of stannous salts are used as catalyst, for example 2.5 parts of the stannous salt of 2-ethyl-caproic acid. The catalyst is dissolved in a little toluene and 1400 parts of acetic anhydride are added. After completing polymerization, the suspension which is obtained has added thereto 0.8 part of sodium acetate, 4 parts of hexamethylene tetramine or 4 parts of 1-phenyl-2,3-dimethyl-5-pyrazolone and heated to boiling point for 5 to 15 hours. The substance is filtered off, boiled with acetone, any adhering anhydride is removed, then washed while stirring well with water at 50° C., and thereafter once again with acetone, the product being dried at 40° C. in vacuo. There are obtained 75 parts of a polyoxymethylene of high molecular weight, which shows practically no ash content and has an intrinsic viscosity of 0.89 (measured in butyrolactone in 0.5% solution at 150° C.). The golden yellow mother liquor is subjected to fractional distillation and split up into acetic acid, acetic anhydride and methylene glycol diacetate and higher homologues.

*Example 8*

As is apparent from the several previous examples, polyoxymethylenes of very high molecular weight (the intrinsic viscosities generally being between 1.5 and 2) are obtained from formaldehyde vapors, in spite of their high degree of impurity, by carrying out the polymerization with stannous compounds as catalysts. Best possible processing to form shaped articles and in addition acetylation reactions proceeding more quickly and quantitatively can, however, be carried out substantially more easily with polymers which have intrinsic viscosities in the region of 0.65 to 1.1. Products with such viscosities can be prepared by adding extremely small amounts of chain-breaking agents or chain-transfer agents in the following manner: the procedure of Example 1 is followed, using methylene chloride as polymerization medium. 0.6 part of stannous octoate is used as catalyst to 1400 parts of methylene chloride. Chain-regulating agents in the quantities indicated in the table are then added to the reaction mixture. After the working up, acetylation, purification and drying, products are obtained which have the following intrinsic viscosities (measured in 0.5% solution at 150° C. in butyrolactone):

| Chain-breaking agent | Intrinsic viscosity | Yield, parts |
|---|---|---|
| None | 1.65 | 109 |
| 2 parts of methylene glycol diacetate | 1.15 | 10 |
| 1 part of methylene glycol diacetate+1 part of acetic anhydride | 1.05 | 102 |
| 2 parts of methylene glycol diacetate+0.3 part of 1-phenyl-2,3-dimethyl-pyrazolone | 0.85 | 100 |
| 2 parts of HOCH$_2$OCH$_2$OH | 1.21 | 104 |
| 2 parts of acetic anhydride | 1.1 | 98 |
| 0.1 part of tri-n-butylamine | 1.19 | 106 |

In particular, alkali metal salts and salts of polyvalent metals other than stannous salts and even those of stannic compounds, have a very great influence on the course of the polymerization. In this way, it is readily possible to obtain viscosity values of 0.4, 0.5 and 0.6 when working in accordance with this example, but the yields are greatly reduced, and in addition less uniform products are obtained, this being shown by a great decrease in the mechanical values, for example the bending strength.

*Example 9*

The procedure is according to Example 1. In order to produce formaldehyde vapors, a paraformaldehyde is used having a water content of 1.2% in combined form and a methoxyl group content of 0.5%. The polymerization medium consists of 1400 parts by volume of acetic acid anhydride having a content of free acetic acid if 0.35%. The following stannous salt compounds may be used as catalysts:

(a) 2.5 parts of stannous formate
(b) 2.5 parts of stannous propionate
(c) 2.5 parts of stannous benzoate
(d) 2.5 parts of stannous salt of phenyl acetic acid
(e) 2.5 parts of stannous salt of hexahydrobenzoic acid
(f) 2.5 parts of Sn salt of 3-chloropropionic acid
(g) 2.5 parts of stannous salt of methylethyl acetic acid
(h) 2.5 parts of stannous crotonic acid
(i) 2.5 parts of stannous salt of ethoxy acetic acid
(j) 2.5 parts of stannous salt of 4-hydroxy butyric acid
(k) 2.5 parts of stannous salt of 4-chlorobenzoic acid
(l) 2.5 parts of stannous salt of 4-nitrobenzoic acid
(m) 2.5 parts of stannous salt of cinnamic acid
(n) 2.5 parts of stannous salt of 2-methylbenzoic acid After polymerization, acetylation and working up according to Example 7, there are obtained polyoxymethylenes of high molecular weight as listed in the following table having intrinsic viscosities measured in 0.5% solution at 150° C. in butyrolactone.

| Catalyst | Intrinsic Viscosity | Yield, parts |
|---|---|---|
| (a) | 0.85 | 70 |
| (b) | 0.78 | 81 |
| (c) | 0.98 | 75 |
| (d) | 1.05 | 73 |
| (e) | 0.74 | 65 |
| (f) | 0.65 | 59 |
| (g) | 1.2 | 73 |
| (h) | 0.80 | 79 |
| (i) | 0.92 | 74 |
| (j) | 0.63 | 61 |
| (k) | 0.75 | 69 |
| (l) | 0.59 | 51 |
| (m) | 0.66 | 62 |
| (n) | 0.83 | 64 |

I claim:

1. A process for the production of polyoxymethylene of a molecular weight of more than 10,000, which comprises polymerizing monomeric formaldehyde containing about 1 to about 5% by weight of water in a substantially anhydrous acylation agent for said polyoxymethylene in the presence of a catalytic amount of a divalent tin salt of a carboxylic acid having up to 20 carbon atoms, said catalytic amount being up to 0.006 mol of said catalyst per mole of monomeric formaldehyde and said polymerizing being effected at a temperature of about −20 to about +70° C., and recovering resulting polyoxymethylene of a molecular weight of more than 10,000 from said substantially anhydrous acylation agent.

2. The process of claim 1 wherein said acylation agent is acetic anhydride.

3. A process for the production of polyoxymethylene of a molecular weight of more than 10,000, which comprises polymerizing monomeric formaldehyde containing about 1 to about 5% by weight of water in a substantially anhydrous alkylation agent for said polyoxymethylene in the presence of a catalytic amount of a divalent tin salt of a carboxylic acid having up to 20 carbon atoms, said catalytic amount being up to 0.01 mol of said catalyst per mol of monomeric formaldehyde and said polymerizing being effected at a temperature of about −20 to about +70° C., and recovering resulting polyoxymethylene of a molecular weight of more than 10,000 from said substantially anhydrous alkylation agent.

4. The process of claim 3 wherein said alkylation agent is ethyl ortho-formate.

5. A process for the production of polyoxymethylene of a molecular weight of more than 10,000 which comprises polymerizing monomeric formaldehyde containing about 1–5% by weight of water in a substantially anhydrous organic liquid medium in the presence of a catalytic amount of a divalent tin salt of a carboxylic acid having up to 20 carbon atoms and in the presence of a chain regulating agent selected from the group consisting of a synthetic polyamide and a polyurethane, said polymerizing being effected at a temperature of about −20 to about +70° C. and recovering resulting polyoxymethylene of a molecular weight of more than 10,000 from said substantially anhydrous organic liquid medium.

6. The process of claim 5 wherein said chain regulating agent is an ε-caprolactam polyamide.

(References on following page)

References Cited by the Examiner

UNITED STATES PATENTS

| | | | |
|---|---|---|---|
| 2,529,622 | 11/1950 | Michael | 260—67 |
| 7,704,765 | 3/1955 | Smithson | 260—67 |
| 2,848,437 | 8/1953 | Langsdorf et al. | 260—67 |
| 2,915,560 | 12/1959 | Steinhardt et al. | 260—67 |
| 2,964,500 | 12/1960 | Jenkins et al. | 260—67 |
| 2,966,476 | 12/1960 | Kralovec et al. | 260—45.9 |
| 2,989,508 | 6/1961 | Hudgin et al. | 260—67 |
| 2,993,025 | 7/1961 | Alsup et al. | 260—45.9 |
| 2,998,409 | 8/1961 | Nogare et al. | 260—67 |
| 3,000,860 | 9/1961 | Brown et al. | 260—67 |
| 3,017,389 | 1/1962 | Langsdorf et al. | 260—67 |
| 3,046,251 | 7/1962 | Wagner | 260—67 |

OTHER REFERENCES

Vogl: Chemistry and Industry, June 3, 1961, pp. 748–749.

WILLIAM H. SHORT, *Primary Examiner.*

JOSEPH R. LIBERMAN, *Examiner.*

L. M. MILLER, *Assistant Examiner.*